(12) United States Patent
Boll

(10) Patent No.: US 6,970,200 B2
(45) Date of Patent: Nov. 29, 2005

(54) SYSTEM AND METHOD FOR A SIMPLIFIED DIGITAL CAMERA INTERFACE FOR VIEWING IMAGES AND CONTROLLING CAMERA OPERATION

(75) Inventor: David W. Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 718 days.

(21) Appl. No.: 10/005,612

(22) Filed: Oct. 26, 2001

(65) Prior Publication Data

US 2003/0081135 A1 May 1, 2003

(51) Int. Cl.$^7$ ............................................. H04N 5/222
(52) U.S. Cl. ............... 348/333.13; 348/376; 348/207.1
(58) Field of Search ...................... 345/397; 396/300; 348/382, 345, 3, 372, 333; 382/305

(56) References Cited

U.S. PATENT DOCUMENTS

| | | | |
|---|---|---|---|
| 6,310,648 B1 * | 10/2001 | Miller et al. | ........... 348/333.05 |
| 6,346,937 B1 * | 2/2002 | Sasaki et al. | ............... 345/211 |
| 6,384,863 B1 * | 5/2002 | Bronson | ...................... 348/373 |
| 6,441,854 B2 * | 8/2002 | Fellegara et al. | ...... 348/333.13 |
| 6,710,801 B1 * | 3/2004 | Kubo | ...................... 348/222.1 |

* cited by examiner

*Primary Examiner*—Ngoc-Yen Vu
*Assistant Examiner*—Kevin Gagliostro

(57) ABSTRACT

A simplified image display control interface provides easy and convenient retrieving and viewing of digital images captured by a digital camera. Two control buttons provide for scrolling backwards or forwards through a plurality of captured images displayed on a display and stored in the digital camera memory. When the oldest captured image has been displayed, subsequent actuation of a control button causes the display to be turned off. When the most recently captured image is displayed, subsequent actuation of another control button causes a live preview to be displayed.

18 Claims, 5 Drawing Sheets

SYSTEM AND METHOD FOR A SIMPLIFIED DIGITAL CAMERA INTERFACE FOR VIEWING IMAGES AND CONTROLLING CAMERA OPERATION

BACKGROUND OF THE INVENTION

1. Field of the Invention

The present invention generally relates to recording and processing digital images and, in particular, to a system and method for providing a simplified, user-friendly interface for operating a digital camera.

2. Related Art

With the advent of digitally based image capturing devices capable of "photographing" an image and providing the image in a digital data format, a digital "photograph" of the image is stored in a memory residing within or coupled to the image capturing device. A nonlimiting example of a digital image capturing device is the digital camera that captures still images and/or video images.

Technological advances have enabled the development of digital cameras that rival the quality of film based cameras. Furthermore, digital camera interfaces have been designed to mimic film camera controls so that knowledgeable photographers may control the picture taking functionalities, such as shutter speed, aperture, flash, zoom and other features.

However, digital cameras are, in essence, special purpose computers employing advanced digital imaging technologies. For the first time user, a complex digital camera may be difficult to operate. Thus, many consumers are not yet interested giving up their easy-to-use film based cameras.

Consumers who are not computer literate may feel uncomfortable with a digital camera in that many of the features of a digital camera are based upon its similarity to a personal computer. For example, pictures are stored in a digital camera memory as digital information. This digital information is conveniently transferable to a personal computer so that, for example, printing devices can be used to make hard copies of the digital images or so that the digital image can be transferred to others electronically. Thus, an owner of a digital camera needs to be computer literate to some degree to be able to operate the camera and to process captured images into viewable images. Compared to a film based camera, where the user inserts film, takes the photographs, and then simply drops off the film at a shop for development, a complex digital camera may present a barrier to user acceptance if the user is not already computer literate.

Thus, a heretofore unaddressed need exists for providing a system and method for an easy to use digital camera display interface. Such an easy to use display interface should not necessarily require the user of the digital camera to be computer literate or knowledgeable in the art of photography. That is, the operational characteristics of the digital camera interface should be readily apparent to practically any user of the digital camera. Also, such an easy to use display interface should be easy to use by individuals that may have limitations in the use of their hands. Furthermore, the interface should employ a minimum number of components to facilitate a lower manufacturing cost.

SUMMARY OF THE INVENTION

The present invention overcomes the inadequacies and deficiencies of the prior art as discussed hereinabove. The present invention, a simplified image display control interface, provides a system and method for easily and conveniently retrieving and viewing a plurality of captured images. As described below, actuation of two control buttons causes the camera processor to retrieve digital image data corresponding to a captured image from the digital camera memory and display the image on the display. Two control buttons provide for scrolling backward or forward through a plurality of captured images stored in the digital camera memory. A third control button is provided for deleting data in memory corresponding to displayed images.

As the user scrolls forward through the images to preview later captured images, the most recently captured image will eventually be displayed. In one embodiment, upon a subsequent actuation of the forward scroll button, a live preview will be displayed. That is, the image currently detected by the digital camera will be displayed on the digital camera display. In another embodiment, actuating the forward scroll button again will result in the display being turned off, thus saving limited battery power resources. Similarly, when the user scrolls backward through the images to preview earlier captured images, the earliest captured image will eventually be reached. In one embodiment, the camera display turns off when the backward scroll button is subsequently actuated.

In another embodiment, a computer readable medium is provided having a program executable by a computer for controlling display of images on a display. The program includes logic configured to perform various steps as described herein.

BRIEF DESCRIPTION OF THE DRAWINGS

The elements of the drawings are not necessarily to scale relative to each other. Like reference numerals designate corresponding parts throughout the several views.

DETAILED DESCRIPTION

Figure 1:
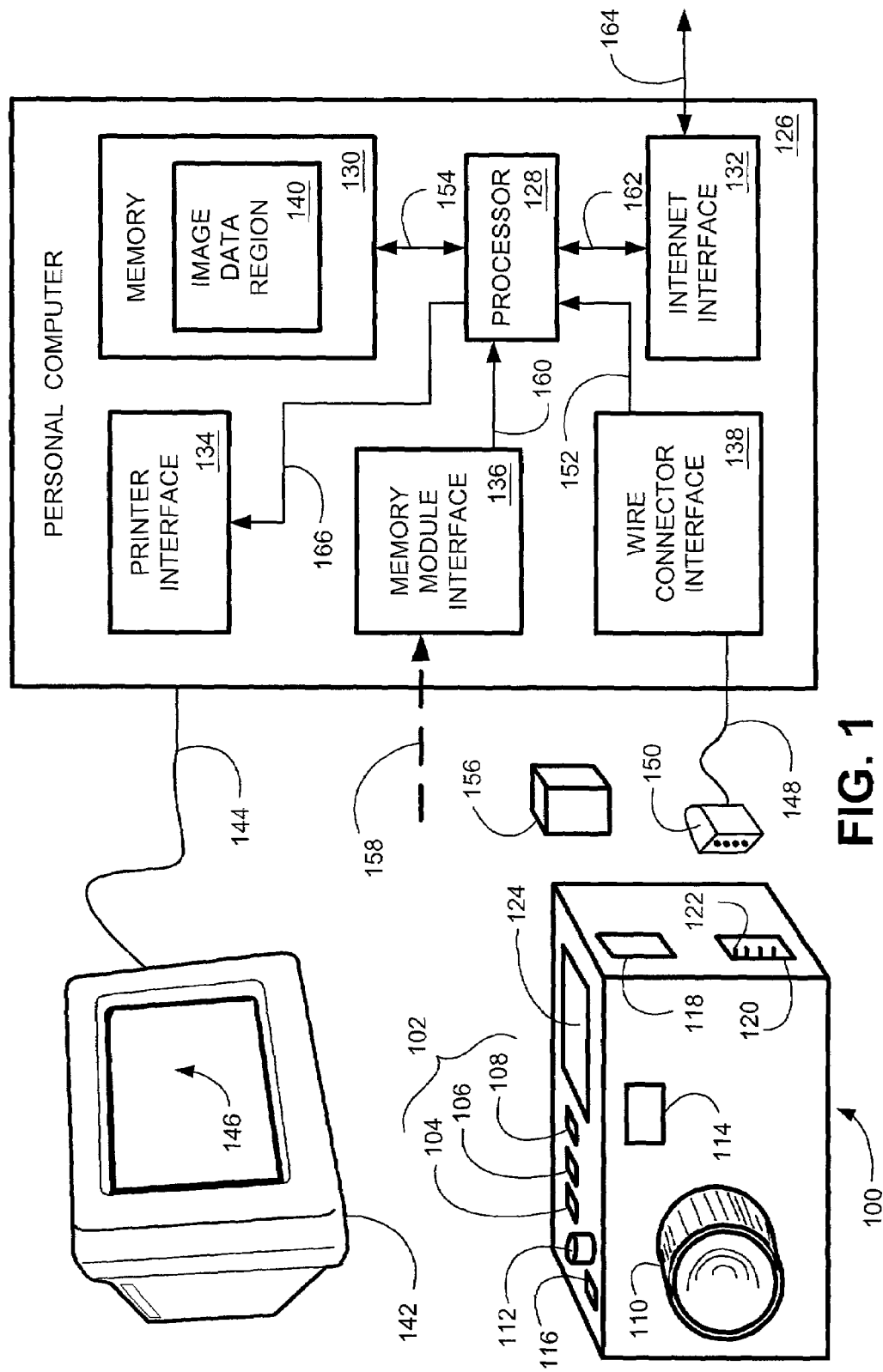
FIG. 1 is a block diagram illustrating a digital camera employing a simplified interface.

FIG. 1 is a block diagram illustrating a digital camera 100 employing a simplified image display control interface 102 that employs three control buttons 104, 106 and 108, described in greater detail below. Digital camera 100 further includes at least a lens unit 110, an image capture actuation button 112, a viewing lens 114, a power switch 116, memory unit interface 118 and a plug-in interface unit 120. Plug-in interface unit 120 includes a plurality of connection pins 122. A display 124 is used for previewing images prior to capturing or for viewing captured images. For convenience of illustration, display 124 is illustrated on the top of digital camera 100.

Operation of digital camera 100 is initiated by actuation of power switch 116 or an equivalent device having the same functionality. When digital camera 100 is turned on, display 124 may remain off so as to conserve limited battery power of digital camera 100. As described in greater detail below, actuation of any one of control buttons 104, 106 and/or 108 will turn on display 124 such that the user (not shown) of digital camera 100 may view a live preview of the image that is being detected through lens unit 110. Alternatively, an image of a previously captured image or a menu screen may be initially displayed. In an alternative embodiment, other buttons, switches or control interface devices are additionally configured to turn on display screen 124 when actuated.

The simplified image display control interface 102 that employs three control buttons 104, 106 and 108 is particularly advantageous for users of digital camera 100 who are not technically familiar with the operation of prior art digital cameras or who may have physical handicaps and/or limitations that make operation of prior art digital cameras difficult. In one embodiment, each one of the control buttons 104, 106 and 108 is a relatively large button positioned on the digital camera to provide easy access and actuation.

Lens unit 110 is a well-known device used for focusing the image on the photosensor. When the operator has focused the image to be captured and is satisfied with it, the operator actuates the image capture actuation button 112 (also referred to as a shutter button or a shutter release button) to cause digital camera 100 to record a digital image, thus "photographing" the image. The operator of the digital camera may visually preview the image before capturing the image on display 124 and/or view the image directly through the viewing lens 114. Detailed operation of these above-described individual components of digital camera 100 are not described in detail herein other than to the extent necessary to understand the operation and functioning of these components when employed as part of the simplified image display control interface 102.

FIG. 1 further illustrates a conventional personal computer 126 that may be employed with digital cameras such that digital images captured by the digital camera may be retrieved, processed, printed and/or e-mailed. Personal computer 126 may include at least a processor 128, a memory 130 an Internet interface 132, a printer interface 134, a memory module interface 136 and a wire connector interface 138. Memory 130 further includes an image data region 140 where retrieved image data from digital camera 100 is stored. Personal computer 126 is further illustrated as being coupled to a display monitor 142, via connection 144. The display monitor 142 includes a display 146 for viewing the captured images.

In one embodiment of digital camera 100, digital camera 100 transfers captured images to personal computer 126 via a hard wire connection 148. Connection 148 is coupled to a plug-in attachment 150. Plug-in attachment 150 is configured to connect to plug-in interface unit 120, and connection pins 122. The user of personal computer 126 and digital camera 100 simply connects plug-in attachment 150 to plug-in interface 120 thereby establishing connectivity between digital camera 100 and personal computer 126. The operator of personal computer 126 and digital camera 100 then instructs personal computer 126 and/or digital camera 100 to transfer digital images from digital camera 100 through wire connector interface 138, through processor 128 via connection 152, and then into image data region 140 of memory 130 via connection 154.

In another embodiment, digital image data is stored in a memory module unit 156. When capturing images with digital camera 100, memory module unit 156 is coupled to digital camera 100 through memory unit interface 118. Digital image data is transferred to personal computer 126 by removing memory module unit 156 from digital camera 100 and coupling memory module unit 156 to memory module interface 136. Typically, a convenient coupling port or interface (not shown) is provided on the surface of personal computer 126 such that memory module unit 156 is directly coupled to personal computer 126, as illustrated by dashed line path 158. Once memory module unit 156 is coupled to memory module interface 136, digital image data is transferred through processor 128 via connection 160 and into image data region 140 of memory 130, via connection 154.

When the user of personal computer 126 has accessed the digital image data corresponding to the images captured by digital camera 100, as described above, the user of personal computer 126 may e-mail selected images to other devices via Internet interface 132, may print selected images via printer interface 134 and/or view selected images via display monitor 142. For convenience of illustration, processor 128 is illustrated as being coupled to Internet interface 132 via connection 162. Internet interface 132 facilitates coupling of personal computer 126 to an external communication system (not shown) via connection 164. Similarly, processor 128 is illustrated as being coupled to the printer interface via connection 166. Printer interface 134 is configured to provide coupling to a printing device (not shown) that would be coupled to personal computer 126 such that selected images are printed.

For convenience, personal computer 126 is illustrated as having only selected components of interest. However, personal computer 126 may include additional internal components that are not illustrated in FIG. 1. These additional components not shown are known in the art and are not described in detail herein other than to the extent necessary to understand the functionality and operation of simplified image display control interface 102 employed by digital camera 100.

Digital camera 100 also includes additional components not shown in FIG. 1. Such components are not discussed herein as such components are not necessarily related to the operation and functionality of simplified image display control interface 102. Furthermore, for convenience of illustration, digital camera 100 is illustrated from a perspective that shows only the front, top and one side view of digital camera 100. Digital camera 100 has additional components located on its hidden sides. Such components are not illustrated or discussed herein as such components are not necessarily related to the operation of digital camera 100 when employed with simplified image display control interface 102. However, such components will be described as required below to the extent that such components (not shown) are related to the operation of digital camera 100 with respect to simplified image display control interface 102.

The components of digital camera 100 described above and illustrated in FIG. 1 may be located in alternative convenient locations on digital camera 100. For example, display 124 may be located on the hidden back surface of digital camera 100. Also, control buttons 104, 106 and 108 of simplified image display control interface 102 may be in different positions of the top surface of digital camera 100 or located on one of the hidden surfaces, such as the back surface of digital camera 100. The placement of control buttons 104, 106 and 108 of simplified image display control interface 102 may be located anywhere on digital camera 100 as long as the user of digital camera 100 has easy and convenient access to control buttons 104, 106 and 108.

Figure 2:
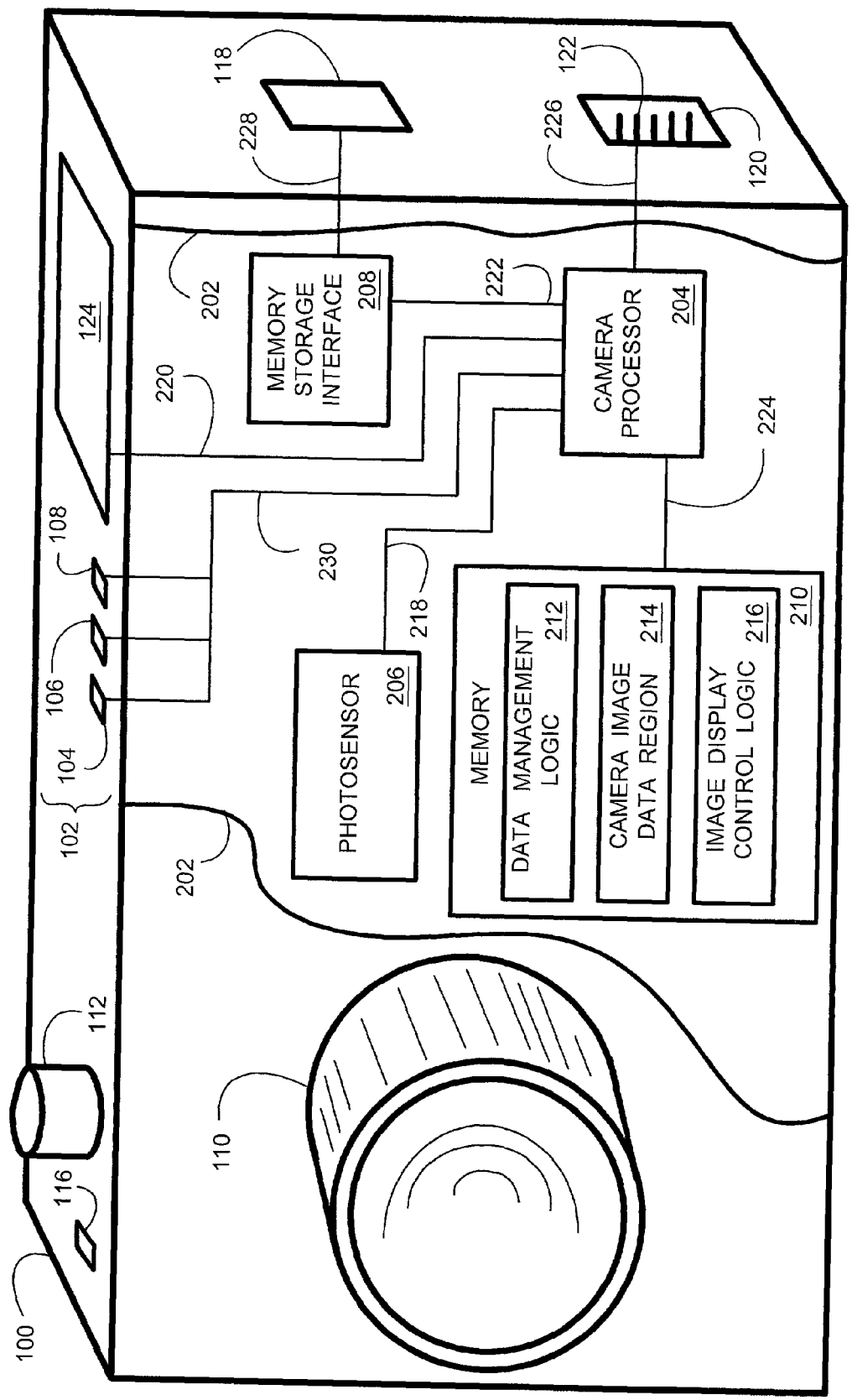
FIG. 2 is a block diagram illustrating selected internal components of the digital camera of FIG. 1.

FIG. 2 is a block diagram illustrating selected internal components of digital camera 100. Cut-away lines 202 demark components located on the outside surfaces of digital camera 100 and components located inside digital camera 100. Thus, control buttons 104, 106 and 108 of simplified image display control interface 102, lens unit 110, image capture actuation button 112, power switch 116, memory unit interface 118, plug-in interface 120 and display 124 are recognized as components located on the surfaces of digital camera 100.

The internal components of digital camera 100 are illustrated between the two cut-away lines 202. Internal components of digital camera 100 include at least a camera processor 204, a photosensor 206, a memory storage interface 208 and a memory 210. Memory 210 further includes regions allocated for data management logic 212, camera image data 214 and image display control logic 216. Photosensor 206 is disposed in a suitable position behind lens unit 110 such that an image (not shown) may be focused onto photosensor 206. Photosensor 206 detects an image through lens unit 110 and provides information corresponding to the detected image to camera processor 204, via connection 218. When the digital camera is operating in a mode that displays the image currently detected by photosensor 206 on display 124, via connection 222, hereinafter referred to as the live preview mode, the user of digital camera 100 can preview a detected current image to determine if the user wants to "photograph" the detected current image. If so, the user of digital camera 100 actuates image capture actuation button 112 such that camera processor 204 transfers the received image information from photosensor 206 into camera image data region 214 of memory 210. That is, when the user actuates image capture actuation button 112, processor 204 reformats the current image detected by photosensor 206 into digital image data that is suitable for storage into memory 210, via connection 224.

As the user of digital camera 110 continues with the process of "photographing" images, a plurality of digital image data corresponding to a plurality of captured images is stored into camera image data region 214 of memory 210. When the user of digital camera 100 has completed the process of capturing images, the user connects the digital camera 110 to personal computer 126 (FIG. 1) by connecting plug-in attachment 150 (FIG. 1) to plug-in interface 120. By providing suitable instructions to personal computer 126 and/or camera processor 204, the captured image data is transferred from camera image data region 214, via connection 226, to personal computer 126 for further processing.

In an alternative embodiment, a memory module unit 156 (FIG. 1) is coupled to digital camera 110 through memory unit interface 118. As the user of digital camera 100 actuates image capture actuation button 112 to cause camera processor 204 to save the current image detected by photosensor 206, camera processor 204 transmits the image data via connection 222 to memory storage interface 208. Memory storage interface 208 configures the received digital image data for transfer to memory module unit 156, via connection 228. In yet another alternative embodiment, memory storage interface 208 is not included. Here, camera processor 204 directly transmits suitably formatted digital image data to personal computer 126 (FIG. 1) via connection 226.

During the process of capturing images, or after the image capture process has been completed, the user of digital camera 100 may wish to view the captured images. Simplified image display control interface 102 provides a system and method for easily and conveniently retrieving and viewing the plurality of captured images. As described below, actuation of one of control buttons 104, 106 and/or 108 may cause camera processor 204 to retrieve digital image data corresponding to a captured image from capture image data region 214 and display the image on display 124. In another embodiment, the digital image data associated with a captured image is retrieved from memory module unit 156 (FIG. 1) that is coupled to digital camera 100. In other instances, actuation of one of the control buttons 104, 106 and/or 108 may cause the current image detected by photosensor 206 to be displayed on display 124. Furthermore, in some instances the actuation of a control button 104, 106 and/or 108 may cause display 124 to turn off. The operation and functionality of control buttons 104, 106 and 108 for controlling the viewing of captured images, for live previewing of the current image detected by photosensor 206, and the turning off of display 124 are described in greater detail below. Thus, the three control buttons 104, 106 and 108 provide a simple and easy to use method and system for controlling the operating mode of display 124.

For convenience of illustration, connection 230 coupling camera processor 204 with control buttons 104, 106 and 108 is illustrated as a single connection from camera processor 204 that branches off to each of individual control buttons 104, 106 and 108. In another embodiment, three individual connections are employed to connect each one of control buttons 104, 106 and 108 individually to camera processor 204.

Figure 3:
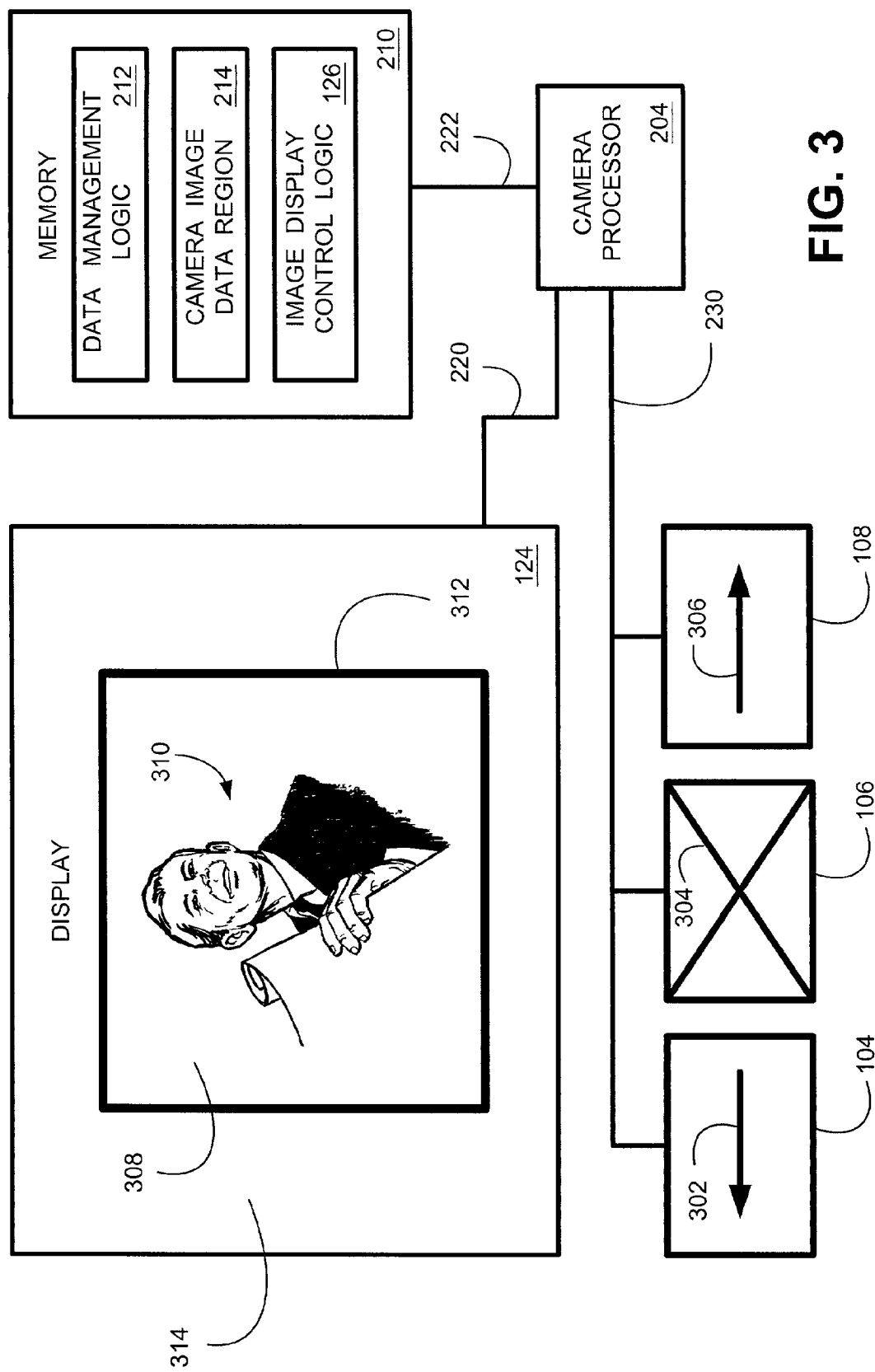
FIG. 3 is a block diagram illustrating the operating buttons employed by the simplified interface in communication with selected internal components of the digital camera of FIG. 1.

FIG. 3 is a block diagram illustrating control buttons 104, 106 and 108 employed by simplified image display control interface 102 (FIGS. 1 and 2) in communication with selected internal components of digital camera 100 (FIGS. 1 and 2). The functionality of each of control buttons 104, 106 and 108 is indicated to the user of digital camera 100 by including the fabrication of an intuitive icon onto the top surface of each one of control buttons 104, 106 and 108. In one embodiment, control button 104 includes a left pointing arrow icon 302. Control button 106 includes an "X" icon 304. Control button 108 includes a right pointing arrow icon 306. Alternative embodiments employ other suitable icons and/or textual labels that are recognizable to the user of the digital camera such that the user of the digital camera easily understands the functionality and operation of control buttons 104, 106 and 108. Furthermore, control buttons 104, 106 and 108 may be positioned on digital camera 100 (FIG. 1) in a different order than shown in FIGS. 1–3, or located in different places on digital camera 100.

Also illustrated in FIG. 3 is an image 308 displayed on display 124. Image 308 includes an object of interest 310 (a businessman). Image 308 is delineated by a thick black image borderline 312 in one embodiment. Thus, the user of digital camera 100 understands that the portion of display 124 within image border 312 corresponds to a captured image and that portion of display 124 that is outside of the image border, denoted as region 314 of display 124, is not associated with the captured image 308. The current image detected by photosensor 206 (FIG. 2) is also similarly displayed. In another embodiment, image borderline 312 is not employed and demarcation between image 308 and display region 314 is indicated by differing colored backgrounds, differing textures and/or other suitable discernible differences. In yet another embodiment, image 308 is configured to occupy the entire region of display 124.

Control buttons 104, 106 and 108 in some instances, described in greater detail below, control the changing of the image displayed on display 124. In one operating mode, control button 106 functions as a delete button. Thus, the user of the digital camera recognizes that the "X" icon 304, or other suitable icon and/or textual label, corresponds to a deletion function such that when control button 106 is actuated, digital image data corresponding to image 308 is deleted from memory 210. In an alternative embodiment, the digital image data corresponding to the displayed image 308 is deleted from memory module unit 156 (FIG. 1). Thus, the user of digital camera 100 simply actuates control button 106 to erase image 308.

When the digital image data corresponding to displayed image 308 is deleted, one embodiment of digital camera 100 displays the previously captured image. In another embodiment, after the image data is deleted, digital camera 100 displays the next most recently captured image. In yet another embodiment, digital camera 100 displays the live preview of the current image detected by photosensor 206 (FIG. 2). If, after deletion of the image data, no other images remain in memory, digital camera 100 defaults to displaying the live preview of the current image. If control button 106 is depressed when the live preview of the current image is displayed, one embodiment of the digital camera turns off the display 124.

Control buttons 104 and 108, in one operating mode, perform the functionality of scrolling through a plurality of captured images on display 124. Actuation of control button 104 causes the image that was previously captured before the current displayed image to be displayed on display 124. Thus, the user of digital camera 100 easily understands that left pointing arrow icon 302, or other suitable icon and/or textual label, indicates that actuation of control button 104 will cause earlier captured images to be displayed on display 124. Control button 104 is also known as a backward scroll button.

In one embodiment of digital camera 100, scrolling through the captured images on display 124 with successive actuations of control button 104 eventually causes display of the oldest captured image residing in memory 210 (FIG. 1), or in memory module unit 156 (FIG. 1), depending upon the embodiment of digital camera 100. When control button 104 is depressed again, display 124 is turned off.

Another embodiment may display a message menu indicating that no earlier captured images are available for display. Then, a subsequent actuation of control button 104 causes display 124 to be turned off. Thus, when the user has scrolled through the captured images to the oldest image stored in memory 214 (or the memory module unit 156), the user understands that actuating control button 104 will cause display 124 to be turned off.

In yet another embodiment, actuation of control button 104 causes display 124 to display a live preview after the oldest captured image is displayed. Then, display 124 is turned off when control button 104 is actuated again.

Similarly, right pointing arrow icon 306 indicates to the user that actuation of button 106 will result in the display of the next most recently captured image on display 124. That is, actuation of control button 108 causes the image that was captured immediately after the currently displayed image to be displayed on the display 124. Thus, the user of digital camera 100 easily understands that right pointing arrow icon 306, or other suitable icon and/or textual label, indicates that actuation of control button 108 will cause more recently captured images to be displayed. Control button 108 is also known as a foreword scroll button.

In one embodiment of digital camera 100, scrolling through the captured images on display 124 with successive actuations of control button 108 eventually causes display of the most recent captured image residing in memory 210 (FIG. 1), or in the memory module unit 156 (FIG. 1), depending upon the embodiment of digital camera 100.

When control button 108 is depressed again, a live preview of the current image detected by photosensor 206 (FIG. 2) is displayed on display 124.

In an alternative embodiment, if control button 108 is actuated again, display 124 is turned off. Another embodiment may display a message menu indicating that no earlier captured images are available for display. Then, a subsequent actuation of control button 108 causes display 124 to be turned off. Thus, when the user has scrolled through the captured images to the most recently stored image in memory 214 (or memory module unit 156), the user understands that actuating control button 108 will cause a live preview to be displayed. In other embodiments, subsequent actuation of control button 108 causes display 124 to be turned off.

Summarizing, control buttons 104 and 108 are understood by the user to provide for the functionality of scrolling backwards or forwards through a plurality of captured images. Furthermore, the user understands that actuating control button 102 will eventually result in display 124 being turned off, thus saving limited battery power resources. And, the user understands that actuating control button 106 will eventually result in a live preview.

Figure 4:
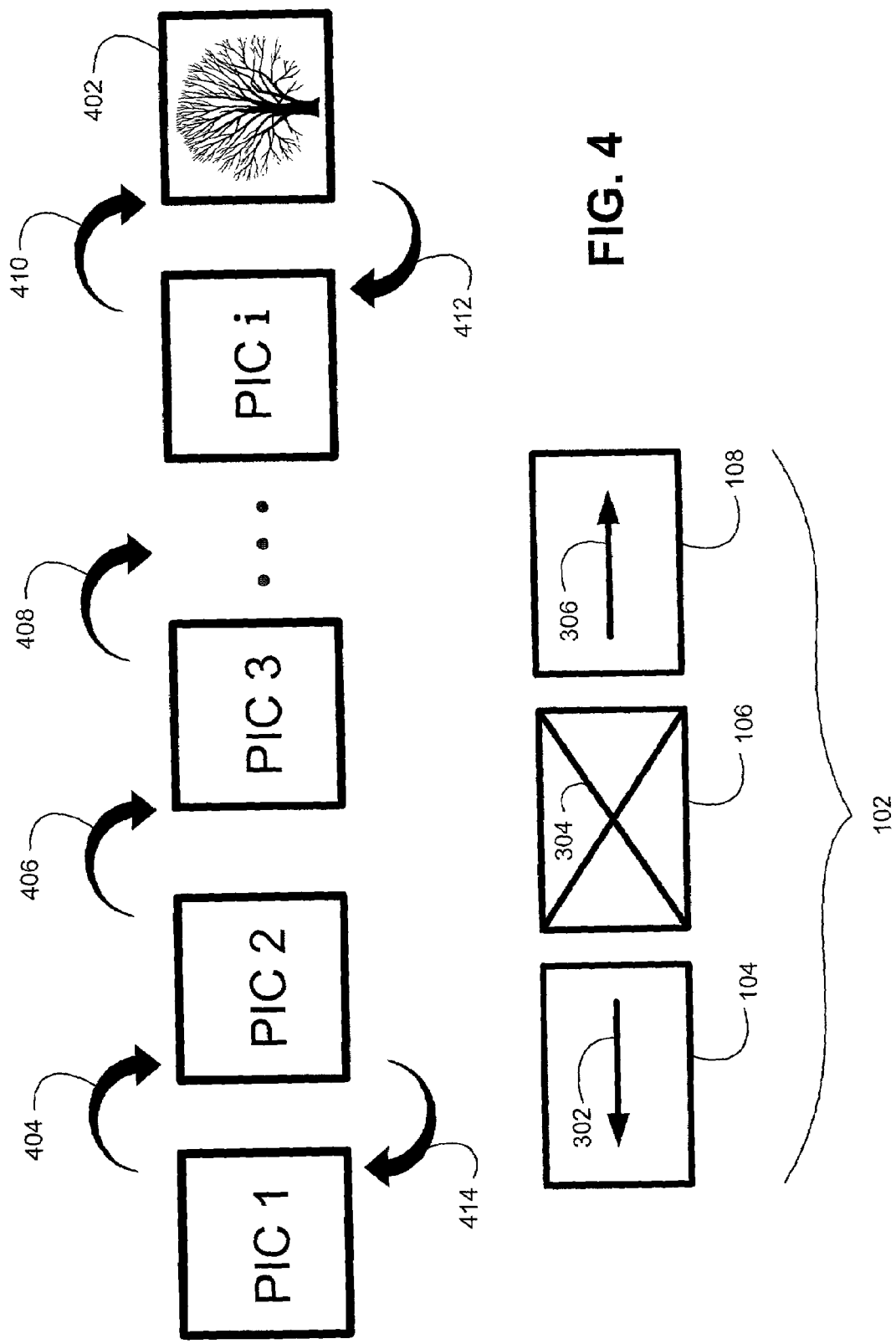
FIG. 4 is a block diagram illustrating the process of viewing images using the control buttons employed by the simplified interface of FIGS. 1–3.

FIG. 4 is a block diagram illustrating the process of viewing images using control buttons 104, 106 and 108 employed by simplified image display control interface 102 (see also FIGS. 1–3). As described above, digital data corresponding to a plurality of captured images is stored in camera image data region 214 of memory 210 (FIG. 2). In another embodiment, digital data corresponding to a plurality of captured images is stored in memory module unit 156 (FIG. 1). Image 402, labeled as PIC 1, is a simplified representation of a first picture that was "photographed" by the user of digital camera 100. That is, PIC 1 is the earliest captured image residing in memory 210 or memory module unit 156, depending upon the embodiment of digital camera 100.

Thus, PIC 2 would be the next most recently captured image that was captured after the image associated with PIC 1 was captured. Likewise, PIC 3 was captured after PIC 2. A plurality of pictures, in the hypothetical example illustrated in FIG. 4, reside in memory 210 or memory module unit 156. PIC 1 corresponds to the most recently captured image. The picture associated with image 402 (a tree) is intended to represent a displayed image of the current image detected by photosensor 206 (FIG. 2) when operating in the live preview mode.

Assuming that in this hypothetical example, PIC 1 is the image currently displayed on display 124 (FIGS. 1–3), in one embodiment, actuation of control button 108 will cause digital camera 100 to change the display to PIC 2. That is, when the user of digital camera 100 actuates control button 108 having right pointing arrow icon 306, the image displayed on display 124 is scrolled to the next most recently captured image (here, PIC 2), as denoted by arrow 404.

A second actuation of control button 108 will cause digital camera 100 to display PIC 3 on display 312, as denoted by arrow 408. Subsequent actuations of control button 108 will cause digital camera 100 to scroll through the images stored in memory 210 or in memory module unit 156 until the most recently captured picture, PIC i, is displayed on display 124, as denoted by arrow 408. Thus, the user of digital camera 100 understands that actuations of control button 108 will simply cause the image displayed on display 124 to scroll to the next most recently captured image.

When the most recently captured image, PIC i, is displayed on display 124, the next actuation of control button 108 in one embodiment will cause the digital camera to display on display 124 the current image that is detected by photosensor 206 (FIG. 2), as denoted by arrow 410. That is, since there are no more recently captured images residing in memory 210 or memory module unit 156, digital camera 100 is instructed to operate in the live preview mode. As described above, another actuation of control button 108 will cause display 124 to be turned off.

When digital camera 100 is operating in the live preview mode such that the current image detected by photosensor 206 (FIG. 2) is displayed on display 124 (FIGS. 1–3), actuation of control button 104 causes digital camera 100 to display the most recently captured image (PIC i). Thus, the displayed image on display 124 changes from image 402 to image PIC i, as denoted by arrow 412. Thus, the user of digital camera 100 understands that the images that have been captured and saved into memory 210 or memory module unit 156 may be viewed by actuating control button 104 when the user is displaying a current image detected by photosensor 206.

Furthermore, the user understands that subsequent actuations of control button 104 will cause digital camera 100 to change the image displayed on display 124 to the next previously captured image. For example, if the user of digital camera 100 was viewing PIC 2, the user understands that the next actuation of control button 104 would cause digital camera 100 to display PIC 1 on display 124, as denoted by arrow 414.

In one embodiment, if digital camera 100 is operating in the preview mode such that the current image detected by photosensor 206 (FIG. 2) is displayed on display 124, and there are no stored images in memory 210 or memory module unit 156, actuation of control button 104 causes display 124 to be turned off. Thus, the user understands that there are no images stored in memory 210 (FIG. 2), or in memory module unit 156 (FIG. 1), depending upon the embodiment of digital camera 100.

Summarizing, simplified image display control interface 102 having the three control buttons 104, 106 and 108 provides an easily understood and simple-to-use interface such that the user of digital camera 100 may scroll through captured images in any desired manner simply by actuating control buttons 104 and 108. Left pointing arrow icon 302 on control button 104 is understood to cause the next previously captured image to be displayed. When the user has scrolled through the captured images to the oldest captured image, a subsequent actuation of control button 104 causes the display to be turned off. Right pointing arrow icon 306 on control button 108 is understood to display the next most recently captured image. When the user has scrolled through the captured images to the most recently captured image, a subsequent actuation of control button 108 causes digital camera 100 to display a live preview. Also, the user understands that actuation of control button 106 will cause deletion of a previously captured image that is currently being displayed, as denoted by "X" icon 304.

Figure 5:
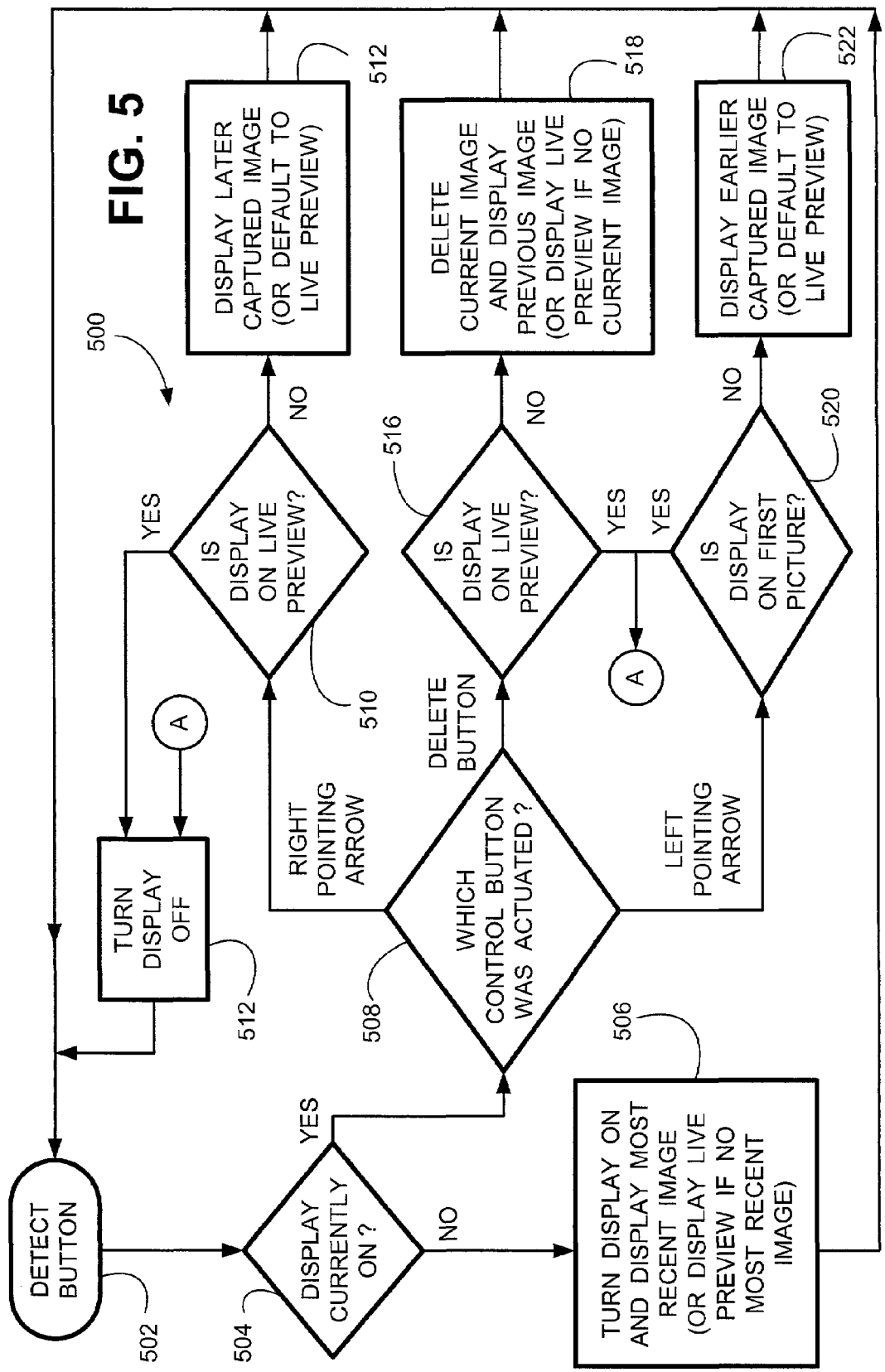
FIG. 5 is a flow chart illustrating a process for operating the digital camera of FIG. 1 with the control buttons employed by the simplified interface of FIGS. 1–4).

FIG. 5 is a flow chart 500 illustrating a process for operating digital camera 100 (FIGS. 1–2) with control buttons 104, 106 and 108 (FIGS. 1–4) employed by simplified image display control interface 102 (FIGS. 1–4). Flow chart 500 shows the architecture, functionality and operation of a possible implementation of the software for implementing the image display control logic 126 (FIGS. 1 and 2). In this regard, each block may represent a module, segment, or portion of code, which comprises one or more executable instructions for implementing the specified logical function(s). It should also be noted that in some alternative implementations, the functions noted in the blocks may occur out of the order noted in FIG. 5 or may include additional functions without departing significantly from the functionality of the simplified image display control interface 102 (FIGS. 1–4). For example, two blocks shown in succession in FIG. 5 may in fact be executed substantially concurrently, the blocks may sometimes be executed in the reverse order, or some of the blocks may not be executed in all instances, depending upon the functionality involved, as will be further clarified below. All such modifications and variations are intended to be included herein within the scope of this disclosure and to be protected by the accompanying claims. The process of using the simplified image display control interface 102 (FIGS. 1–4) begins at block 502. At block 502, digital camera 100 detects the actuation of at least one of control buttons 104, 106 or 108. In alternative embodiments, actuation of other selected buttons, switches or other user interface devices may initiate the process depicted by flow chart 500.

At block 504, a determination is made whether or not display 124 (FIGS. 1–3) is currently on. If not (the NO condition), the process proceeds to block 506 where display 124 is turned on. In one embodiment, the most recently captured image is displayed on display 124. An alternative embodiment displays the earliest captured image when the display is turned on. Yet another embodiment displays a suitable menu to the user. In other embodiments, if no images are residing in memory 210, digital camera 100 defaults to the live preview mode of operation and displays the current image detected by photosensor 206 (FIG. 2). Summarizing, the user understands that if the display is off, actuating any one of control buttons 104, 106 or 108 will turn on display 124. The process then returns to block 502 to await actuation of one of control buttons 104, 106 or 108.

If at block 504 display 124 is currently on (the YES condition), the process proceeds to block 508. At block 508, a determination is made which of control buttons 104, 106 or 108 was actuated.

If control button 108 having right pointing arrow icon 306 (FIG. 3) is actuated at block 508, the process proceeds to block 510. At block 510, a determination is made whether or not display 124 is operating in the live preview mode of operation. If so (the YES condition), the process proceeds to block 512 such that display 124 is turned off. Then, the process proceeds to block 502 to await detection of an actuation of one of control buttons 104, 106 or 108.

However, if at block 510 the display is not operating in the live preview mode (the NO condition), the process proceeds to block 514 such that display 124 displays the next most recently captured image. That is, digital camera 100 understands that the user has viewed display screen 124 showing an image, and that the user has actuated control button 108 to view the next most recently captured image. (In one embodiment, if there are no more recent captured images residing in memory 210, or memory module unit 156, the screen defaults to the live preview mode such that the current image detected by photosensor 206 is displayed.) Then, the process returns to block 502 to await actuation of another one of control buttons 104, 106 or 108.

Alternatively, if control button 106 having "X" icon 304 (FIG. 3) is actuated at block 508, the process proceeds to block 516. At block 516, a determination is made whether or not display 124 is operating in the live preview mode of operation. If so (the YES condition), the process proceeds to block 512 such that display 124 is turned off. Then, the process proceeds to block 502 to await detection of an actuation of one of control buttons 104, 106 or 108.

However, if at block 516 the display is not operating in the live preview mode (the NO condition), the process proceeds to block 518 such that data corresponding to the displayed image is deleted, erased or otherwise removed from memory 210 or memory module unit 156, depending upon the embodiment of digital camera 100. That is, digital camera 100 understands that the user has viewed display screen 124 showing an image, and that the user has actuated control button 106 intending to delete that image from digital camera 100 memory. Then, the process returns to block 502 to await actuation of another one of control buttons 104, 106 or 108. (In one embodiment, after deletion of data corresponding to the displayed image has been performed by digital camera 100, the next previously captured image is displayed on display 124. In an alternative embodiment, the next most recently captured image is displayed. In yet another embodiment, a live preview of the current image is displayed on display 124.)

Finally, if control button 104 having left pointing arrow icon 302 (FIG. 2) is actuated at block 508, the process proceeds to block 520. At block 520, a determination is made whether or not display 124 is operating in a live preview mode of operation. If so (the YES condition), the process proceeds to block 522 such that display 124 is turned off. Then, the process proceeds to block 502 to await detection of an actuation of one of control buttons 104, 106 or 108.

However, if at block 520 the display is not operating in the live preview mode (the NO condition), the process proceeds to block 522 such that display 124 displays the next previously captured image. That is, digital camera 100 understands that the user has viewed display screen 124 showing an image, and that the user has actuated control button 104 to view the next most previously captured image. (In one embodiment, if there are no previously captured images residing in memory 210, or memory module unit 156, the screen defaults to the live preview mode such that the current image detected by photosensor 206 is displayed.) Then, the process returns to block 502 to await actuation of another one of control buttons 104, 106 or 108.

The above-described embodiment of simplified image display control interface 102 (FIGS. 1–4) illustrates the placement of control buttons 104, 106 and 108 in a horizontal alignment with respect to display 124. Furthermore, control button 106 (having the functionality of deletion of image data and denoted with an "X" icon 204) is illustrated as being placed between control buttons 104 and 108. In alternative embodiments, the alignment and/or positioning of control buttons 104, 106 and 108 of simplified image display control interface 102 may be anywhere on digital camera 100 as long as the user of digital camera 100 has easy and convenient access to control buttons 104, 106 and 108. Furthermore, control buttons 104, 106 and 108 do not need to be adjacent to each other. For example, one embodiment may position the three control buttons 104, 106 and 108 in a vertical alignment with respect to display 124. In another embodiment, left scrolling control button 104 is located to the left of display 124 and right scrolling control button 108 is located to the right of display 124. In yet another embodiment, deletion control button 106 is located in a convenient location remote from the two scrolling control buttons 104 and 108.

The above-described embodiment of simplified image display control interface 102 (FIGS. 1–4) describes control buttons 104, 106 and 108 as pressure actuated buttons that are pushed downward by the user to actuate. In another embodiment, other suitable sensitive buttons are employed.

In another embodiment, the three control buttons are implemented as a touch sensitive portions of a display such that the user merely touches a portion of the display that is displaying an icon corresponding to one of control buttons 140, 106 and/or 108.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A display interface for displaying images comprising:
    a display configured to display an image; and
    a simplified image display control interface consisting of:
        a first button configured to change an image shown by the display to the next most recently captured image;
        a second button configured to change an image shown by the display to the next previously captured image; and
        a third button configured to delete data associated with the image shown by the display, wherein the third button is further configured to turn off the display when there is no data associated with the image shown by the display to delete.

2. The display interface of claim 1, wherein the first button is further configured to display a live preview when there is no next most recently captured image, and wherein the second button is further configured to turn off the display when there is no next previously captured image.

3. The display interface of claim 1, further comprising;
    a memory configured to store data corresponding to at least one captured image; and
    a processor unit coupled to the memory and configured to receive signals from the first button and the second button, the processor unit further configured to retrieve from the memory data associated with the captured images specified by the first button and the second button.

4. The display interface of claim 1, wherein the first button and the second button are further configured to turn on the display when the display is off.

5. The display interface of claim 1, further comprising a right pointing arrow icon residing on the first button.

6. The display interface of claim 1, further comprising a left pointing arrow icon residing on the second button.

7. A method for controlling display of images on a display, the method comprising the steps of:
    detecting actuation of a simplified image display control interface consisting of a first control button, a second control button and a third button;
    displaying a next most recently captured image on the display when the first control button is actuated;
    displaying a next previously captured image on the display when the second control button is actuated;
    deleting data associated with the image shown by the display when the third control button is actuated; and
    turning off the display when there is no data associated with the image shown by the display to delete when the third control button is actuated.

8. The method of claim 7, further comprising the steps of:
   determining when the next most recently captured image is available for displaying on the display when the first control button is actuated; and
   displaying a current image detected by an image sensor when the next most recently captured image is not available.

9. The method of claim 8, further comprising the step of turning off the display in response to actuation of the first control button when the current image is displayed.

10. The method of claim 7, further comprising the steps of:
    determining if the next previously captured image is available for displaying on the display when the second control button is actuated; and
    turning off the display in response to actuation of the second control button when the next previously captured image is not available.

11. The method of claim 7, further comprising the steps of:
    determining if the data associated with the image shown on the display is available for deleting when the third control button is actuated; and
    displaying a current image detected by an image sensor when the data is not available.

12. The method of claim 7, further comprising the steps of:
    determining when the display is off; and
    turning on the display in response to detecting actuation of one of the first control button and the second control button when the display is off.

13. A system for controlling display of images on a display comprising:
    means for detecting actuation of a simplified image display control interface consisting of a first control button, a second control button and a third control button;
    means for displaying a next most recently captured image on the display when the first control button is actuated;
    means for deleting data associated with the image shown on the display when the second control button is actuated;
    means for displaying a next previously captured image on the display when the third control button is actuated;
    means for determining when the next most recently captured image is available for displaying on the display when the first control button is actuated and means for displaying a current image detected by an image sensor when the next most recently captured image is not available;
    means for determining if the data associated with the image shown on the display is available for deleting when the second control button is actuated and means for displaying a current image detected by an image sensor when the data is not available; and
    means for determining if the next previously captured image is available for displaying on the display when the third control button is actuated and means for displaying a current image detected by an image sensor when the next previously captured image is not available.

14. The system of claim 13, further comprising:
    means for determining when the display is off; and
    means for turning on the display in response to detecting actuation of one of the first control button, the second control button and the third control button when the display is off.

15. A computer readable medium having a program executable by a computer for controlling display of images on a display, the program comprising logic configured to perform the steps of:
    detecting actuation of a simplified image display control interface consisting of a first control button and a second control button;
    displaying a live preview after the most recently captured image has been displayed on the display in response to actuation of the first control button;
    turning off the display after the oldest captured image on the display has been displayed in response to actuation of the second control button;
    deleting data associated with the image shown by the display when the third control button is actuated; and
    turning off the display when there is no data associated with the image shown by the display to delete when the third control button is actuated.

16. A display interface for displaying images comprising:
    a digital image capturing device;
    a display residing on the digital image capture device configured to display an image; and
    a simplified image display control interface consisting of:
    a first button configured to display a live preview on the display after a most recently captured image has been displayed;
    a second button configured to turn off the display after an oldest captured image has been displayed; and
    a third button configured to delete data associated with the image shown by the display, wherein the third button is further configured to turn off the display when there is no data associated with the image shown by the display to delete.

17. The display interface of claim 16, wherein the digital image capturing device is a digital camera.

18. A computer readable medium having a program executable by a computer for controlling display of images on a display, the program comprising logic configured to perform the steps of:
    detecting actuation of a simplified image display control interface consisting of a first control button, a second control button and a third button;
    displaying a next most recently captured image on the display when the first control button is actuated; displaying a next previously captured image on the display when the second control button is actuated;
    deleting data associated with the image shown by the display when the third control button is actuated; and
    turning off the display when there is no data associated with the image shown by the display to delete when the third control button is actuated.

* * * * *

UNITED STATES PATENT AND TRADEMARK OFFICE
CERTIFICATE OF CORRECTION

PATENT NO. : 6,970,200 B2 Page 1 of 1
APPLICATION NO. : 10/005612
DATED : November 29, 2005
INVENTOR(S) : David W. Boll It is certified that error appears in the above-identified patent and that said Letters Patent is hereby corrected as shown below:

In column 8, line 43, delete "PIC 1" and insert -- PIC i --, therefor.

Signed and Sealed this

Twenty-fifth Day of August, 2009

David J. Kappos
*Director of the United States Patent and Trademark Office*